(12) United States Patent
Ryan et al.

(10) Patent No.: US 8,287,030 B2
(45) Date of Patent: Oct. 16, 2012

(54) DRAG REDUCING APPARATUS FOR A VEHICLE

(75) Inventors: Patrick E. Ryan, Auburn Township, OH (US); J. Barry Ryan, Springfield, VA (US); James C. Ryan, Lancaster, NY (US); William J. Ryan, Rye, CO (US); Paul J. Pawlowski, Chagrin Falls, OH (US); Kenneth Chaloupek, Medina, OH (US); Peter Huggins, Ashtabula, OH (US); Steven Fenske, Medina, OH (US); Mohammad Kassemi, Beachwood, OH (US)

(73) Assignee: Airodynamic Trailer Systems, LLC, Aurora, OH (US)

( * ) Notice: Subject to any disclaimer, the term of this patent is extended or adjusted under 35 U.S.C. 154(b) by 18 days.

(21) Appl. No.: 12/594,662

(22) PCT Filed: Apr. 4, 2008

(86) PCT No.: PCT/US2008/059382
§ 371 (c)(1),
(2), (4) Date: Dec. 23, 2009

(87) PCT Pub. No.: WO2008/124573
PCT Pub. Date: Oct. 16, 2008

(65) Prior Publication Data
US 2010/0181799 A1 Jul. 22, 2010

Related U.S. Application Data

(60) Provisional application No. 60/907,554, filed on Apr. 5, 2007.

(51) Int. Cl.
*B60J 1/00* (2006.01)
(52) U.S. Cl. ...................................................... 296/180.4
(58) Field of Classification Search ............... 296/180.4, 296/180.1, 180.5, 180.3, 180.2
See application file for complete search history.

(56) References Cited

U.S. PATENT DOCUMENTS

| | | | | |
|---|---|---|---|---|
| 2,737,411 | A * | 3/1956 | Potter | 296/180.4 |
| 3,425,740 | A * | 2/1969 | de Vaughn | 296/163 |
| 4,006,932 | A | 2/1977 | McDonald | |
| 4,030,779 | A * | 6/1977 | Johnson | 296/180.4 |
| 4,142,755 | A * | 3/1979 | Keedy | 296/180.2 |
| 4,236,745 | A * | 12/1980 | Davis | 296/180.4 |
| 4,257,641 | A * | 3/1981 | Keedy | 296/180.4 |

(Continued)

OTHER PUBLICATIONS

International Search Report, Aug. 6, 2008.

*Primary Examiner* — Kiran B Patel
(74) *Attorney, Agent, or Firm* — Fay Sharpe LLP; Karl W. Hauber

(57) ABSTRACT

The disclosure comprises a pair of inflatable substantially inelastic lobes. A single lobe can be mounted on each of the rear trailer doors of a standard tractor-trailer unit. Each lobe can be inflated or deployed to provide an aerodynamic substantially planar contour extending rearwardly of the rear end of the vehicle. The aerodynamic shape of the lobes with stable and substantially planar external surfaces for air to pass over can be created by a series of internal cords and flag sets extending substantially horizontally and vertically in an array from one side of the lobe to the other side of each lobe. When the lobes are deflated, the trailer doors can be opened and latched to the side of the trailer in a conventional manner.

12 Claims, 13 Drawing Sheets

U.S. PATENT DOCUMENTS

| | | | | |
|---|---|---|---|---|
| 4,433,865 A * | 2/1984 | Crompton, Jr. | | 296/180.5 |
| 4,451,074 A * | 5/1984 | Scanlon | | 296/180.4 |
| 4,458,936 A * | 7/1984 | Mulholland | | 296/180.4 |
| 4,601,508 A * | 7/1986 | Kerian | | 296/180.4 |
| 4,682,808 A * | 7/1987 | Bilanin | | 296/180.4 |
| 4,688,841 A * | 8/1987 | Moore | | 296/180.4 |
| 4,702,509 A * | 10/1987 | Elliott, Sr. | | 296/180.4 |
| 4,741,569 A * | 5/1988 | Sutphen | | 296/180.4 |
| 4,818,015 A * | 4/1989 | Scanlon | | 296/180.1 |
| 4,978,162 A * | 12/1990 | Labbe | | 296/180.2 |
| 5,058,945 A * | 10/1991 | Elliott et al. | | 296/180.5 |
| 5,236,347 A | 8/1993 | Andrus | | |
| 5,240,306 A * | 8/1993 | Flemming | | 296/180.4 |
| 5,280,990 A * | 1/1994 | Rinard | | 296/180.1 |
| 5,375,903 A * | 12/1994 | Lechner | | 296/180.1 |
| 5,498,059 A * | 3/1996 | Switlik | | 296/180.1 |
| 5,823,610 A * | 10/1998 | Ryan et al. | | 296/180.4 |
| 5,947,548 A * | 9/1999 | Carper et al. | | 296/180.1 |
| 6,092,861 A * | 7/2000 | Whelan | | 296/180.2 |
| 6,257,654 B1 | 7/2001 | Boivin | | |
| 6,286,894 B1 * | 9/2001 | Kingham | | 296/181.5 |
| 6,309,010 B1 * | 10/2001 | Whitten | | 296/180.4 |
| 6,321,659 B1 | 11/2001 | Gelbert | | |
| 6,409,252 B1 * | 6/2002 | Andrus | | 296/180.4 |
| 6,457,766 B1 * | 10/2002 | Telnack | | 296/180.4 |
| 6,467,833 B1 * | 10/2002 | Travers | | 296/180.4 |
| 6,485,087 B1 * | 11/2002 | Roberge et al. | | 296/180.5 |
| 6,666,498 B1 * | 12/2003 | Whitten | | 296/180.4 |
| 6,742,616 B2 * | 6/2004 | Leban | | 180/116 |
| 6,799,791 B2 * | 10/2004 | Reiman et al. | | 296/180.1 |
| 6,959,958 B2 * | 11/2005 | Basford | | 296/180.1 |
| 7,147,270 B1 * | 12/2006 | Andrus et al. | | 296/180.5 |
| 7,207,620 B2 * | 4/2007 | Cosgrove et al. | | 296/180.4 |
| 7,243,980 B2 * | 7/2007 | Vala | | 296/180.4 |
| 7,255,387 B2 * | 8/2007 | Wood | | 296/180.1 |
| 7,374,230 B2 * | 5/2008 | Breidenbach | | 296/180.4 |
| 7,380,868 B2 * | 6/2008 | Breidenbach | | 296/180.1 |
| 7,431,381 B2 * | 10/2008 | Wood | | 296/180.1 |
| 7,537,270 B2 * | 5/2009 | O'Grady | | 296/180.4 |
| 7,585,015 B2 * | 9/2009 | Wood | | 296/180.4 |
| 7,618,086 B2 * | 11/2009 | Breidenbach | | 296/180.4 |
| 7,641,262 B2 * | 1/2010 | Nusbaum | | 296/180.5 |
| 7,699,382 B2 * | 4/2010 | Roush et al. | | 296/186.3 |
| 7,726,724 B2 * | 6/2010 | Kohls | | 296/180.1 |
| 7,748,771 B2 * | 7/2010 | Distel et al. | | 296/180.4 |
| 7,784,854 B2 * | 8/2010 | Breidenbach | | 296/180.1 |
| 7,845,708 B2 * | 12/2010 | Breidenbach | | 296/180.4 |
| 7,850,224 B2 * | 12/2010 | Breidenbach | | 296/180.1 |
| 7,854,468 B2 * | 12/2010 | Vogel et al. | | 296/180.1 |
| 7,857,376 B2 * | 12/2010 | Breidenbach | | 296/180.1 |
| 7,866,734 B2 * | 1/2011 | Mracek | | 296/180.4 |
| 7,914,034 B2 * | 3/2011 | Roush | | 280/656 |
| 2003/0205913 A1 * | 11/2003 | Leonard | | 296/180.4 |
| 2006/0103167 A1 | 5/2006 | Wong et al. | | |
| 2008/0309122 A1 * | 12/2008 | Smith et al. | | 296/180.1 |
| 2009/0026797 A1 * | 1/2009 | Wood | | 296/180.1 |
| 2009/0179456 A1 * | 7/2009 | Holubar | | 296/180.4 |
| 2009/0236872 A1 * | 9/2009 | Wood | | 296/180.1 |
| 2009/0256386 A1 * | 10/2009 | Wood | | 296/180.1 |
| 2011/0037291 A1 * | 2/2011 | Pickering | | 296/180.4 |
| 2011/0068603 A1 * | 3/2011 | Domo et al. | | 296/180.1 |
| 2011/0084516 A1 * | 4/2011 | Smith et al. | | 296/180.4 |
| 2011/0084517 A1 * | 4/2011 | Vogel et al. | | 296/180.4 |

* cited by examiner

DRAG REDUCING APPARATUS FOR A VEHICLE

BACKGROUND

Various devices are currently known to increase the aerodynamic efficiency of a truck, semi trailer, or other large moving object. It has long been recognized that the rectangular high profile shape of these vehicles and the speeds necessary for travel increase the amount of air drag. Reducing the effects of air drag has the greatest potential to reduce overall fuel consumption. The disclosure relates to add-on aerodynamic air deflectors for the rear surface or leeward face of a transport trailer. For example, the air deflector boattails can be mounted to swing-doors on a box van or other long haul transport trailers.

Inflatable drag reducers have been described (e.g. McDonald (1477) U.S. Pat. No. 4,006,932, Ryan (1498) U.S. Pat. No. 5,823,610, Andrus (2002) U.S. Pat. No. 6,409,252), and are more practical than rigid versions (e.g. Lechner (1494) U.S. Pat. No. 5,375,903, Switlik (1496) U.S. Pat. No. 5,498,059, Boivin (2001) U.S. Pat. No. 6,257,654 B1), because inflatables are light-weight and can be collapsible to a very thin state so as not to interfere with complete trailer door opening which is important because of the limited room to maneuver at most loading docks. However, given that the majority of standard long-haul box van transport trailers are typically a double door (i.e. swing door) configuration, it is beneficial to have a drag reducer with two separate portions (a separate portion associated with each door). Additionally, the two separate portions should, as a coordinated unit, provide beneficial drag reduction. It is also beneficial for the external surfaces over which the airstream passes to be substantially planar for minimum turbulence creation and maximum drag reduction. Inflatables naturally tend towards a spherical or curved shape without an internal means of controlling, for example, bulging of the external surfaces.

It is of course well known that the box shape of trailers of tractor-trailer vehicle combinations, and other truck-trailer combinations, is the result of a need to optimize cargo space therewithin, and it is likewise well known that the boxlike configuration is not aerodynamically efficient. The aerodynamic drag resulting from the box shape accounts for a considerable percentage of the fuel consumption of large trucks and tractor-trailer vehicle combinations during highway operation thereof. In an effort to improve the operating efficiency of such vehicles, the tops of the cabs of trucks and tractors and the upper forward ends of both the tractor and trailer have been streamlined by using a wide variety of body contours and wind foil devices. For the same purposes, the rear ends of transport trailers have been provided with inflatable drag reducing devices or bladders such as those shown, for example, in U.S. Pat. No. 4,006,932 to McDonald, U.S. Pat. No. 4,601,508 to Kerian, U.S. Pat. No. 4,702,509 to Elliott, U.S. Pat. No. 4,741,569 to Sutphen, and U.S. Pat. No. 6,409,252 to Andrus.

Air foils mounted on the cabs of trucks and trailers can be rigid and permanent in character in that the areas on which the air foils are mounted do not need to be accessed in connection with use or operation of the vehicle. On the other hand, the rear ends of trailers do have to be accessible in that they are closed by doors providing access to the interior thereof for loading and unloading purposes. Accordingly, aerodynamic and drag reducing devices designed for use on the rear ends of trailers can be detachable as shown in the patent to Elliott or provided individually on the doors of the trailer as shown in the other patents referred to above. As disclosed in Elliott, if the device is not going to be used it would have to be stored somewhere in the vehicle or, in the manner of the devices disclosed in the patents to McDonald, Kerian, Sutphen, and Andrus, merely deflated and allowed to remain on the door. Removal and storage is a labor intensive and time-consuming operation in addition to requiring storage space.

For these reasons inflatable drag resistors (i.e. boattails) have become exemplary because they are light, inexpensive, and may be collapsed without the use of an excessive number of moving parts, examples of such devices are disclosed in U.S. Pat. No. 4,978,162 to Labbe, U.S. Pat. No. 5,236,347 to Andrus, U.S. Pat. No. 5,375,903 to Lechner and U.S. Pat. No. 5,823,610 to Ryan et al. However, despite the preference of inflatable boattails, not many are in use because they still tend to fail in solving the problems currently associated with loading and unloading the tractor-trailer because the wind dam is attached as one unit to the back. (See Lechner, Andrus).

The devices currently known to increase aerodynamic efficiency, while somewhat effective, suffer from a number of other drawbacks. The previous devices, heretofore known, have been attached to the back of trailers often include loose pieces that must be attached and removed to accommodate loading and unloading. As a result, the pieces are easy to lose, and are time-consuming to assemble because they are heavy and bulky making them difficult to both attach and remove. Similarly, other devices do not allow for the convenient loading and unloading of the trailer's cargo because they consist of a single attached unit that must be removed in order to open and close the trailer doors. Furthermore, often the prior art devices are ineffective in that they provide little drag reduction when in use or are costly to produce and install.

Accordingly a need exists for an improved wind dam device for effectively reducing the air drag of a tractor-trailer.

SUMMARY

According to an aspect of the disclosure, an aerodynamic drag reducing apparatus is provided having a shape with sloped flat or substantially planar surfaces formed from a soft or flexible inflatable material substantially defined as a lobe or bag, or a pair thereof. The present disclosure provides a network of internal cords, flags, and/or straps consisting of an array of substantially horizontal cords and flags that stabilize and flatten the lateral surfaces or sides of each bag, and an array of substantially vertical cords and flags that flatten the upper and lower surfaces of each bag. In addition, substantially horizontal and vertical cords and flags can be provided to the interior of each bag to stabilize and flatten the rear or aft face of each of the bags. The present disclosure provides a configuration of internal cords, flags and/or gussets that allow the two bags to maintain independent substantially flat or planar external surfaces that are held firmly in place even in heavy crosswinds which can be experienced at vehicle operating speeds in conjunction with the turbulent air stream therearound.

According to another aspect of the disclosure, an inflatable drag reducer is provided and is adapted to be mounted on the rear doors of a vehicle transport trailer. The drag reducer comprises a pair of flexible enclosed lobes with one lobe mounted onto each of the two trailer rear doors. The lobes have a base surface adjacent to the trailer doors. The lobes have opposing ends, opposing sides, and a terminal aft-face over which air passes during forward motion of the trailer. The lobes contain an array of internal inelastic cords extending between the opposing ends and the opposing sides, such that upon inflation each of the lobes assume a truncated substantially pyramidal shape with the ends, the sides, and the aft-face surfaces being substantially planar. In addition, the opposing ends and the opposing sides each have sloping surfaces relative to the base surface.

According to still another aspect of the disclosure, an inflatable drag reducer is provided and is adapted to be mounted on the rear doors of a vehicle transport trailer. The drag reducer comprises a pair of flexible enclosed lobes with one lobe mounted onto each of the two trailer rear doors. The lobes each have a base surface mounted to the trailer door. The lobes have opposing ends, opposing sides, and a terminal aft-face over which air passes during forward motion of the trailer. The drag reducer further includes a mechanism for inflating and deflating the lobes such that upon inflation each of the lobes assume a substantially pyramidal shape with the ends, the sides, and the aft-face surfaces being substantially planar. The opposing ends and the opposing sides each have sloping surfaces relative to the base surface wherein a medial side of one of the lobes diverges from a medial side of another one of the lobes. When the lobes are deflated, the trailer doors can be opened and latched to the side of the trailer in a conventional manner.

BRIEF DESCRIPTION OF THE DRAWINGS

The foregoing objects, and others, will in part be obvious and in part pointed out more fully hereinafter in conjunction with the written description of exemplary embodiments of the disclosure illustrated in the accompanying drawings in which.

DETAILED DESCRIPTION

The present disclosure provides for drag reduction of at least 6% on a moving object through the atmosphere, thus increasing fuel efficiency by at least 3%. This is accomplished by attaching a drag lobe to the leeward face or end of the trailer, thus delaying the flow separation to a point further downstream with less intensity. Due to the resulting decrease in drag having a great affect on larger bodies (i.e. tractor-trailers or semi-trailers) the drag lobe's use will be described in relation to tractor-trailers, but the invention is not limited to this area.

Figure 1:
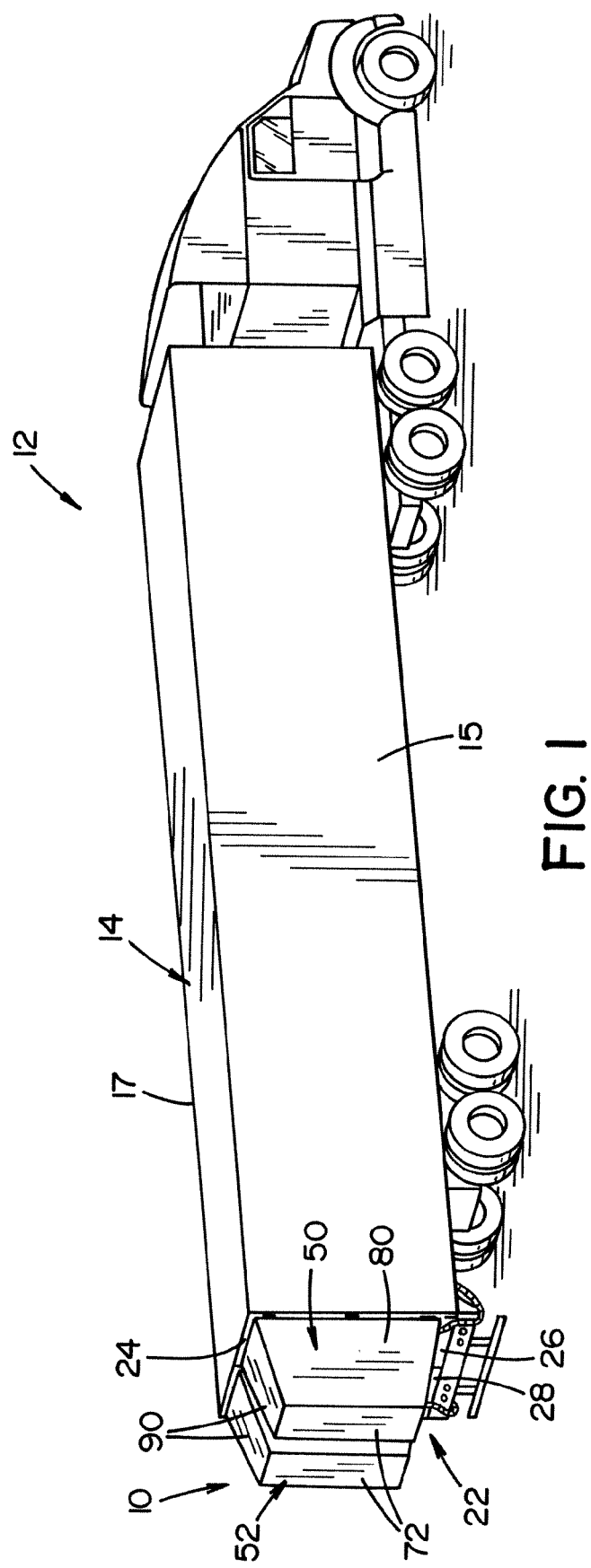
FIG. 1 is a schematic perspective view of a tractor trailer vehicle with a drag reducing apparatus in the inflated position attached to the rear (leeward face) of the trailer.
Figure 2:
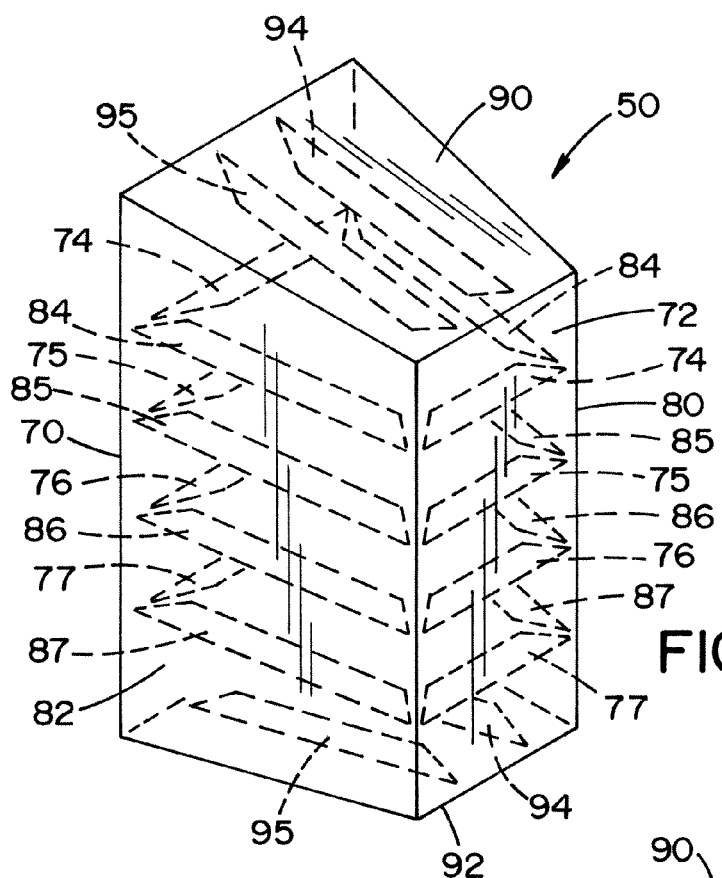
FIG. 2 is a rear perspective view of one of the lobes in accordance with the drag reducing apparatus of FIG. 1.
Figure 3:
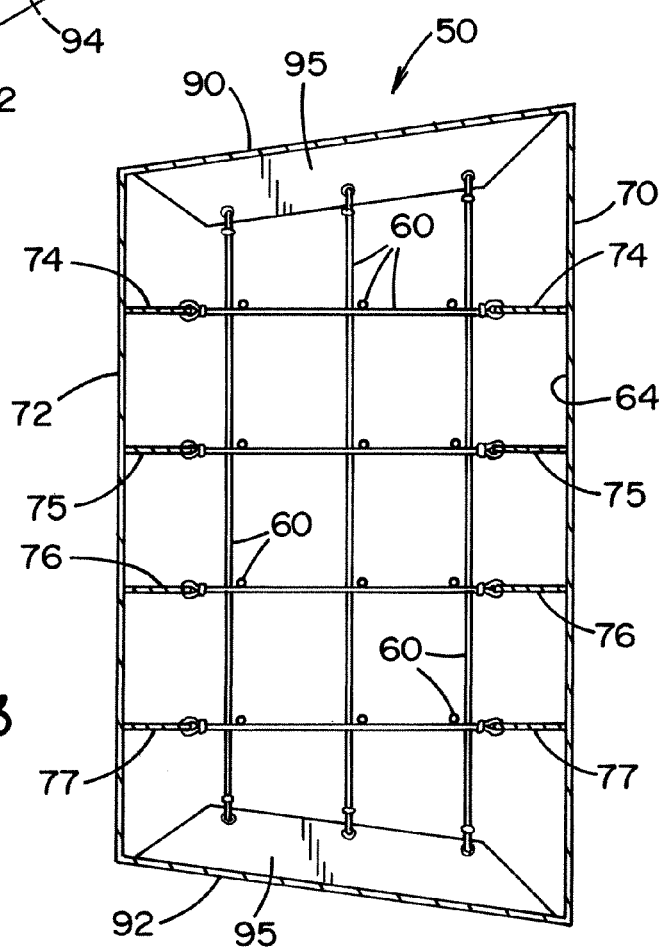
FIG. 3 is a sectional view of one of the lobes in accordance with the drag reducing apparatus.
Figure 4:
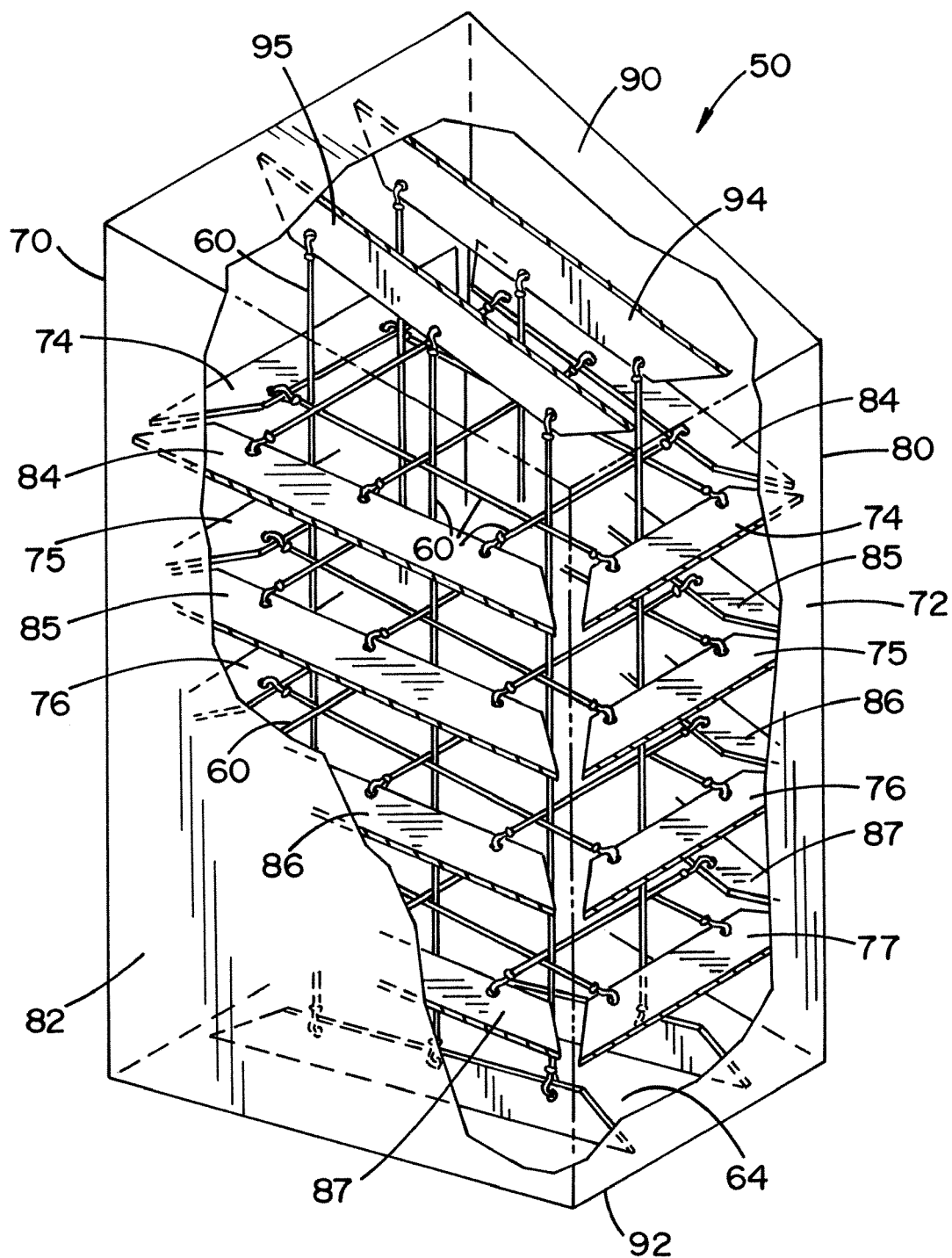
FIG. 4 is an enlarged rear perspective view of one of the lobes, partially cut away, in accordance with the drag reducing apparatus of FIG. 2.
Figure 5:
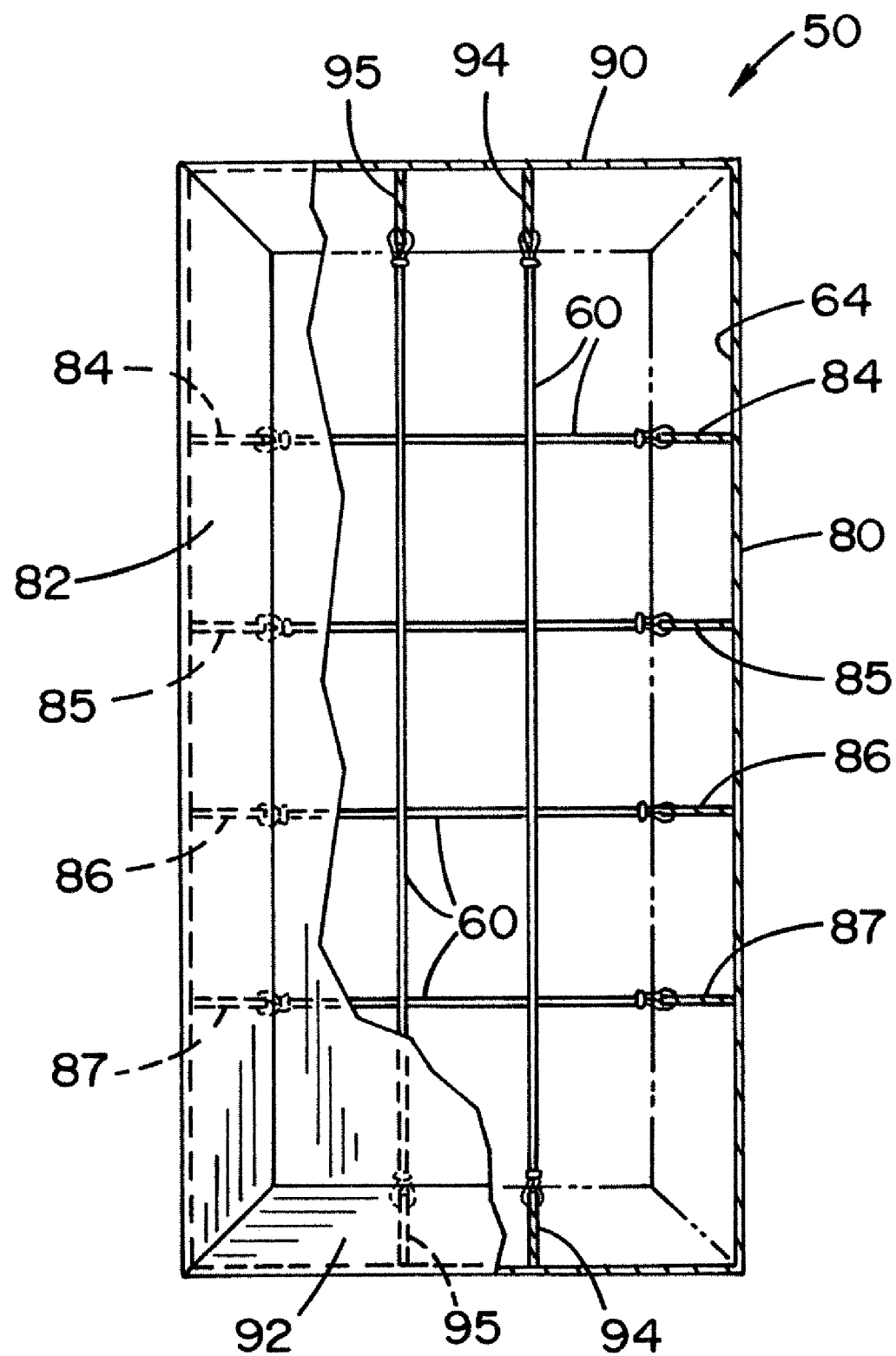
FIG. 5 is a rear partial sectional view of one of the lobes in accordance with the drag reducing apparatus showing the sloping surfaces of the lobe.
Figure 6:
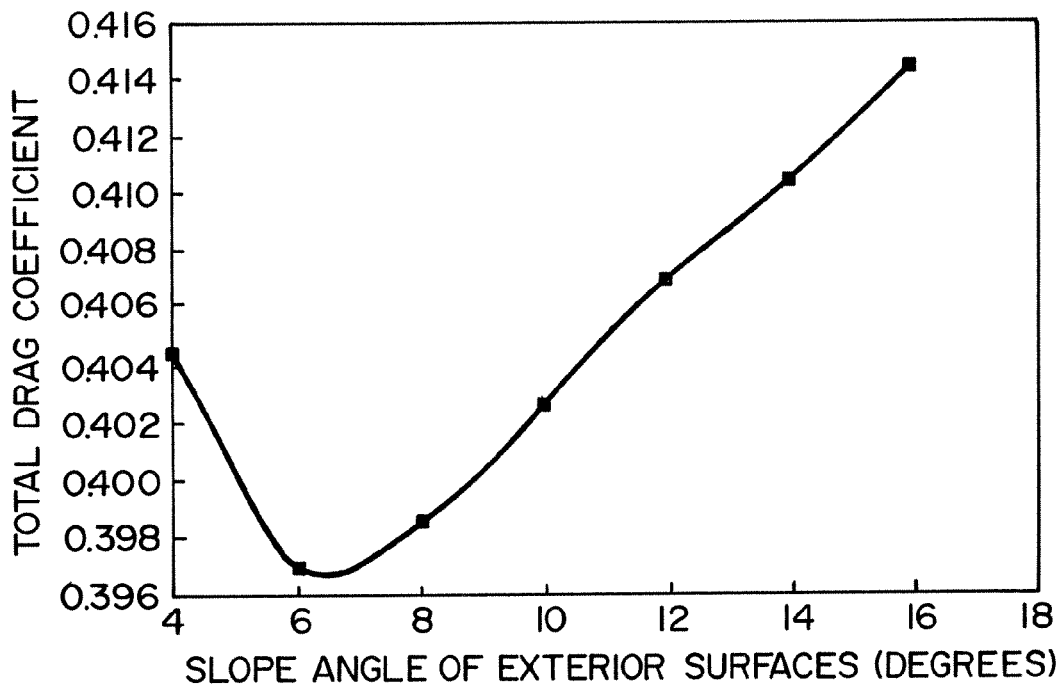
FIG. 6 is a computational fluid dynamic (CFD) model showing the results of total drag coefficient as a function of the slope of descent along the exterior surfaces of each lobe.
Figure 7:
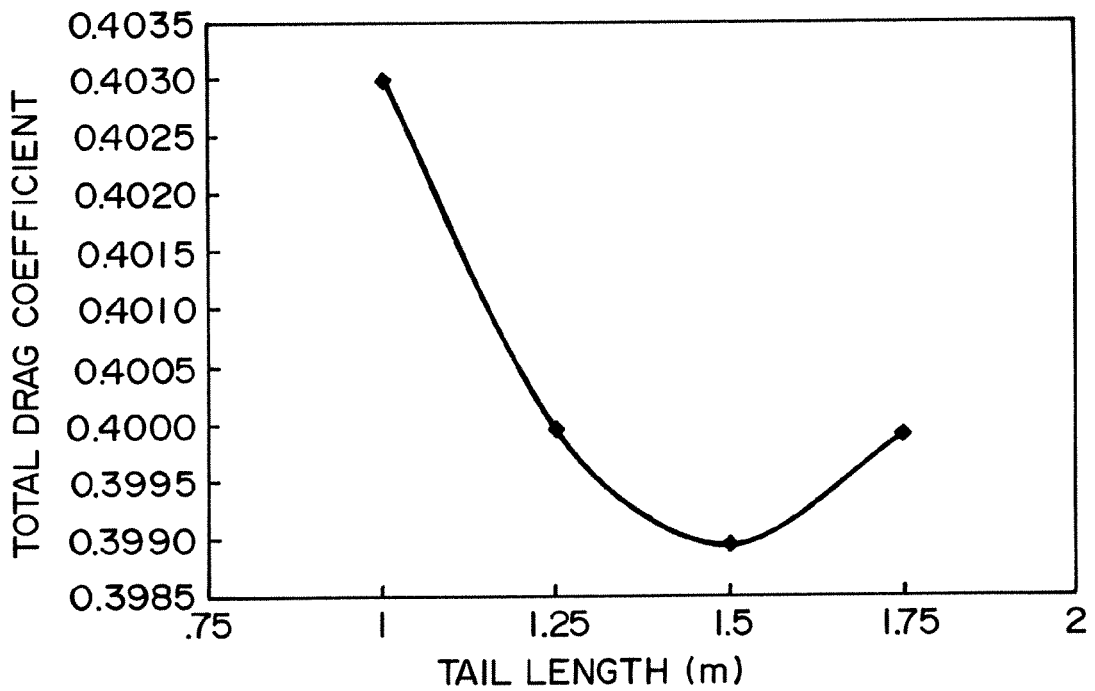
FIG. 7 is a computational fluid dynamic (CFD) model showing the results of base drag coefficient changes as a function of the lobe length.
Figure 8:
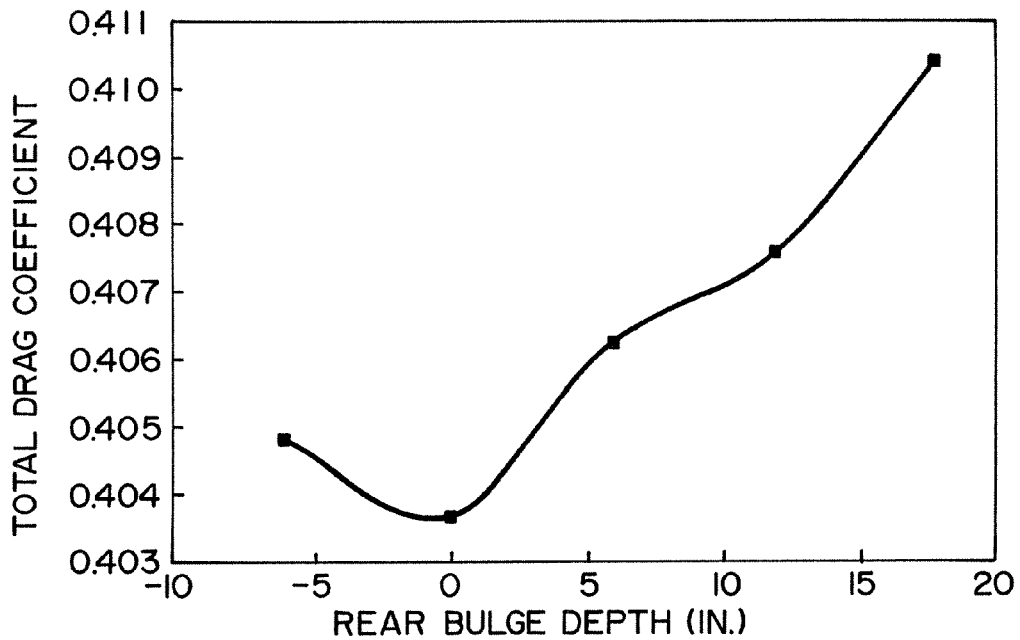
FIG. 8 is a computational fluid dynamic (CFD) model showing the results of drag coefficient changes as a function of each lobe's bulge at the aft face.
Figure 9:
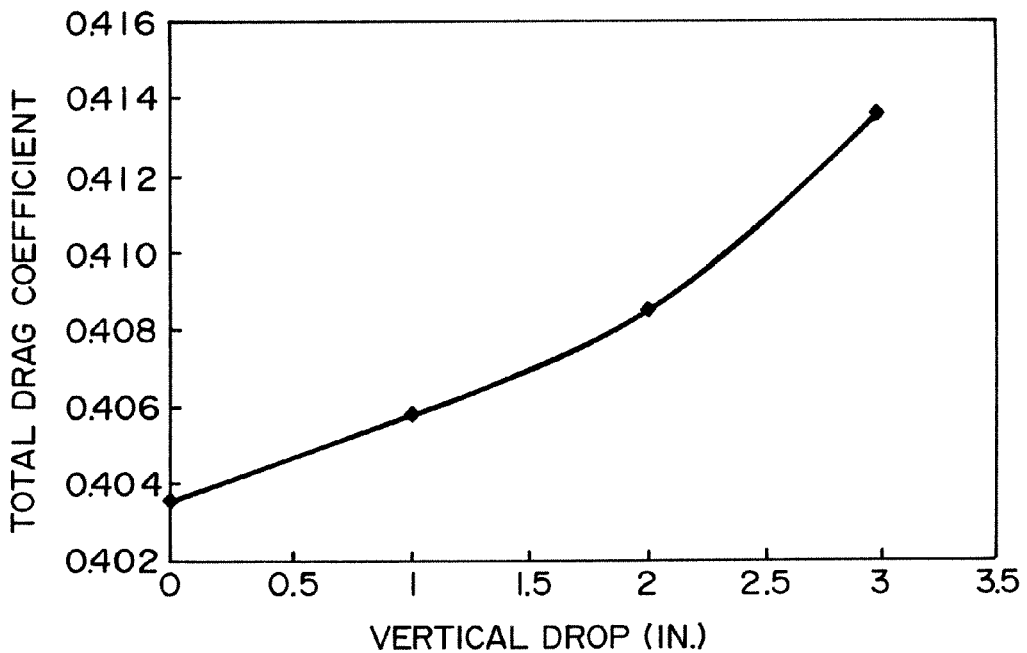
FIG. 9 is a computational fluid dynamic (CFD) model showing the results of drag coefficient changes as a function of each lobe's vertical drop as measured from the roof of the trailer.

Referring now to FIGS. 1-5, wherein the showings are for the purpose of illustrating embodiments only and not for the purpose of limiting the disclosure, there is shown a drag reducing apparatus 10 in accordance with the disclosure mounted on a rear end of a motor vehicle 12 (FIG. 1). The vehicle 12 can include a trailer 14 as part of a tractor-trailer vehicle combination wherein the trailer 14 further includes an opposed pair of parallel vertical side walls 15, 17 and opposed parallel top and bottom walls. The rear end 22 of the trailer 14 can further include a substantially flat upwardly extending rear surface 24 which, in the embodiment illustrated, is substantially defined by a pair of rear doors 26, 28. The rear end 22 of the trailer is defined by peripheral trailer frame portions which are coplanar with and extend about the doors 26, 28. In one exemplary embodiment, the doors 26, 28 are respectively mounted on frame portions by hinges such that the doors 26, 28 are horizontally pivotal about vertical hinge axes between the closed positions shown in the drawings (i.e. FIGS. 1, and 12) and open positions (i.e. FIGS. 13, and 14A) in which the doors 26, 28 extend laterally outwardly and, preferably, forwardly of the trailer frame portions when in the fully opened and latched position. The doors 26, 28 typically hinge around the vertical axes such that the exterior sides of the doors are respectively proximal to opposing sides 15, 17 of the trailer 14. The sides and walls of the trailer 14 can intersect the rear surfaces of the rear end 22 to provide an opposed pair of parallel vertical edges and an opposed pair of parallel horizontal edges.

Figure 14A:
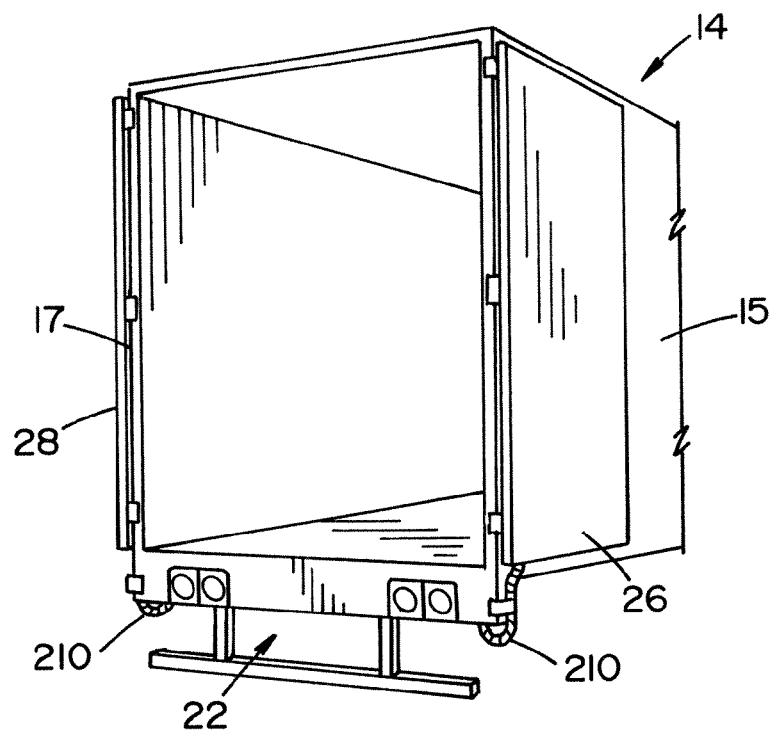
Figure 14B:
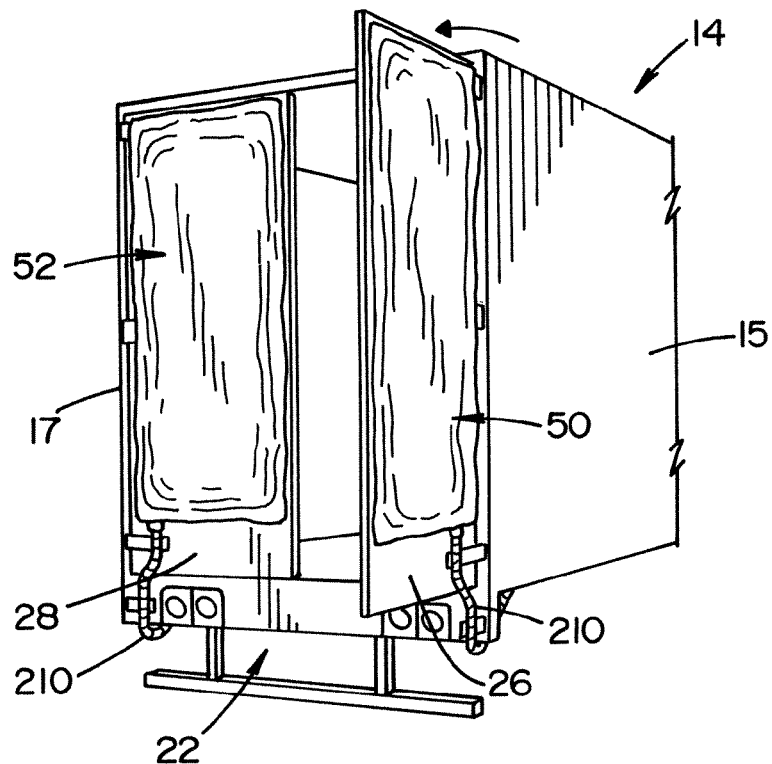
Figure 14C:
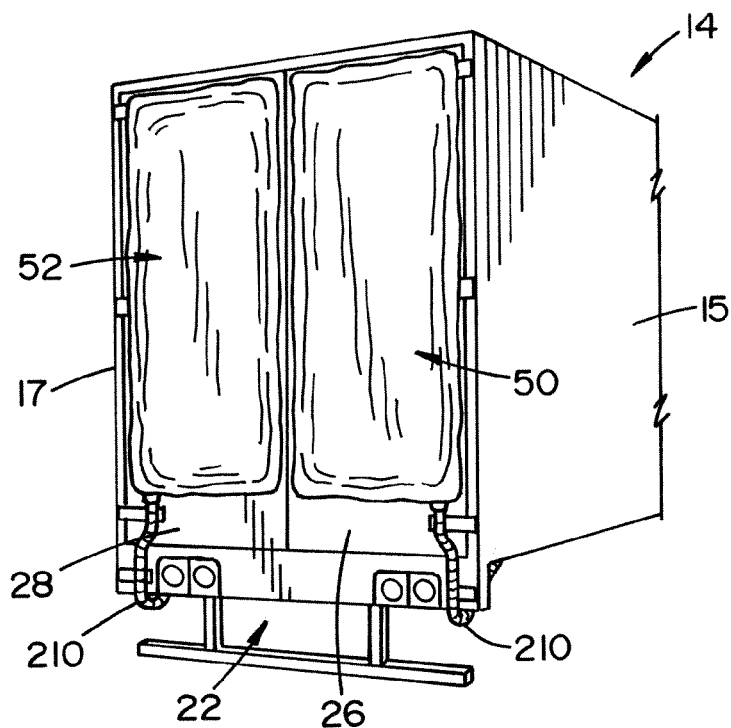
Figure 14D:
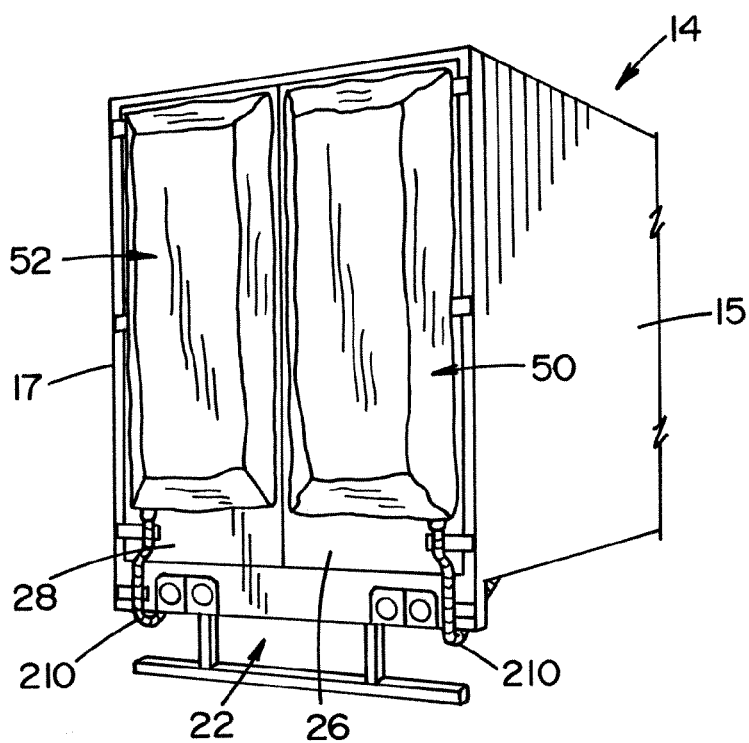
Figure 14E:
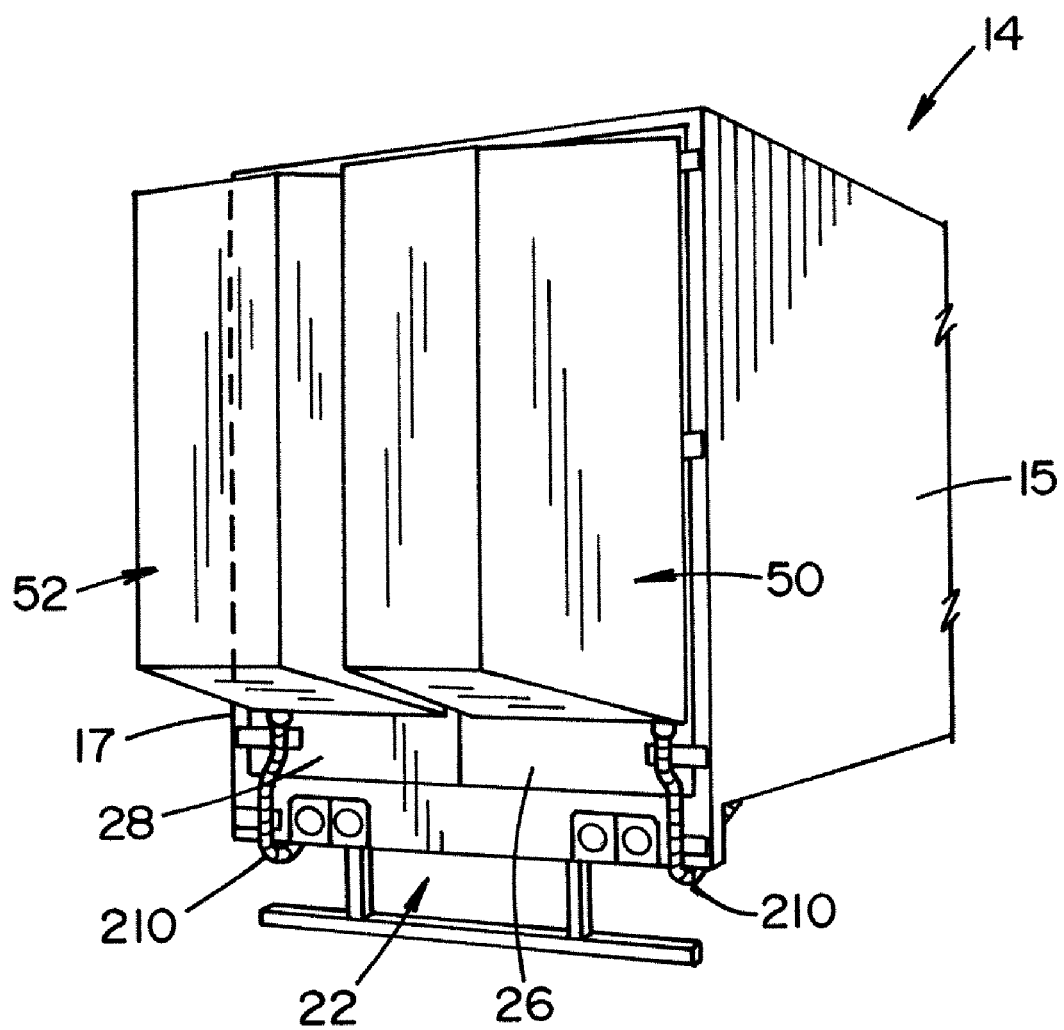

In one exemplary embodiment illustrated in FIGS. 1-5, the drag reducing apparatus 10 includes a pair of inflatable lobes or bags 50, 52. Each lobe or bag 50, 52 can be mounted on a rear door 26, 28 as described in greater detail hereinafter. Each lobe 50, 52 can be adapted to be displaced from a deflated or compressed position to a deployed or inflated position overlying a respective rear door 26, 28 of the trailer 14 between opposing edges and, in the latter position, is adapted to be inflated to provide an aerodynamic contour extending rearwardly of the vehicle 12 as schematically illustrated in FIGS. 1 and 14E. The lobes 50, 52 are shown in a deployed position (FIG. 14E) and a stowed position (FIG. 14A-14C); to be described in more detail hereinafter.

The lobes 50, 52 can be made from, for example, a polymer coated polyester fabric. The fabric can be constructed of a relatively thin, light, and flexible material that is non-elastic in structure and resistant to tears, punctures, abrasion, ozone hydrocarbons and other adverse elements. The purpose for retaining the lobes 50, 52 against the rear doors 26, 28, upon deflation, is to ensure that the lobes 50, 52 do not sag or inhibit the operator from access when loading or unloading the trailer 14.

When the lobes 50, 52 are in the deployed position and secured relative to doors 26, 28 as described above, they are adapted to be inflated so as to extend rearwardly from doors 26, 28 and provide the aerodynamic contours to be described in more detail hereinafter. As will be appreciated from FIGS.

1-5 of the drawings, when the inflatable lobe 50, 52 is inflated to provide the aerodynamic profile for which it is configured, the lobe walls have substantially planar outer surfaces. In one embodiment, the lobes or bags 50, 52 achieve stability and avoid surface flailing during inflation and deflation via a series of substantially inelastic cords 60 and flag sets oriented in an array on the interior or inner surfaces 64 of each bag. In one arrangement, an array of horizontal substantially inelastic cords can originate from one side 70 of the bag and extend to the other opposing side 72 of the bag connecting flag sets 74, 75, 76, 77 at spaced positions on the inner surface 64. It is to be appreciated that there can also be numerous substantially horizontal cords 60 connecting flag sets 84, 85, 86, 87 between the opposing sides 80, 82 of each lobe. Additionally, an array of substantially vertical inelastic cords 60 (not illustrated) can connect the upper surface or end 90 and the lower surface or opposing end 92 of each bag via a plurality of flag sets 94, 95. The substantially horizontal and vertical cords 60 can be attached to inside flag sets that can be heat sealed to the inside surface of the bags (see FIG. 4). The cords 60 and flag sets restrain the lobes 50, 52 to a shape (refer to FIGS. 2, 3, and 5) that substantially conforms to the drag reducer hereinafter described. The aforementioned construction facilitates the desired inflated and substantially planar shape, without which the lobes would form more to the shape of a sphere or into a plurality of somewhat 'quilted' segments.

As described above, the present disclosure provides for the placement of the array of cords 60, or similar connecting devices (FIG. 2-5), for the dual lobe 50, 52 configuration such that each lobe comprises an exterior of sloped substantially planar surfaces. The upper and lower surfaces or ends 90, 92 can each have a slope angle from about 4 degrees to about 12 degrees as measured from a first plane perpendicular to the rear door (i.e. slope of descent). The left and right sides 80, 82 of each lobe 50, 52 can each have a slope angle from about 4 degrees to about 12 degrees as measured from a second plane perpendicular to the rear of vehicle 22 (i.e. slope of descent). The first and second planes are orthogonal to one another. In another arrangement, the slope angle of the upper and lower surfaces 90, 92, as well as the opposing sides 80, 82 can be from about 6 degrees to about 10 degrees.

The sloping surfaces 80, 82, 90, 92 of each lobe 50, 52 merge to form a substantially planar aft-face surface 72. It is to be appreciated that the individual bags 50, 52 mounted to left and right rear doors can be interchangeable with one another and mountable to either of the rear doors due to the symmetrical configuration of each bag 50, 52. In one exemplary embodiment, the sloping top surface 90, the sloping bottom surface 92, the pair of sloping sides 80, 82 and the aft-face 72 of each lobe form a truncated substantially pyramidal shape (FIGS. 1-5 and 14E) over which the air passes during forward motion of the trailer 14. In one exemplary embodiment, each lobe can be configured such that the aft-face or aft-side 72 is less than 6 feet away from, or distal to, the rear door (i.e. tail length) when the lobe is in the deployed position. In another arrangement, each lobe can be configured such that the aft-face 72 is from about 4 feet to about 5 feet away from the rear door when the lobe is in the deployed position.

The opposing top and bottom surfaces 90, 92 of each lobe define a height. The height can taper from a maximum height to a minimum height. The maximum height, in one exemplary embodiment, can be from about 4 to about 10 feet in height. The maximum height corresponds to the dimension between the upper and lower edges of the base or mounting surface 70. The minimum height (i.e., height of aft-face 72) can be from about 70% to about 94% of the maximum height. The opposite sides 80, 82 define a width. The width tapers from a maximum width to a minimum width. The maximum width corresponds to the dimension between the left and right edges of the base or mounting surface 70. The minimum width (i.e., width of aft-face 72) can be from about 60% to about 90% of the maximum width. The area of the aft-face surface or side 72 can range from about 40% to about 90% of the area of the base or mounting surface 70. The mounting surface 70 can include welding cords (not illustrated) attached around the outside perimeter, or substantially around the perimeter, of each lobe. The welded cords can then be slid through a mating "c" hold down rail or channel attached to the outside of each respective door. It is to be appreciated that the "c" rail can be attached to the door with round head bolts and nuts, or similar.

The above described configuration for the drag reducer results in dual truncated substantially pyramidal shapes extending from respective rear doors of the trailer. The resultant drag reduction can amount to as much as 8% based on computational fluid dynamics (CFD) analysis of drag and the associated velocity contours. The resulting drag reductions based on a sample of exemplary lobes having different slope angles, dimensions (i.e., tail length), aft-face configurations, and vertical drop mounting are displayed in the graphs of FIG. 6-9, respectively. The results were used to configure lobes 50, 52 as described above.

It is to be appreciated that the dual lobe 50, 52 configuration can provide diverging medial sides (i.e., side 80 of lobe 52 and side 82 of lobe 50) which reduces the drag coefficient and results in less drag as compared to a single lobe configuration. The two separate lobes 50, 52, as a coordinated and mounted unit, have been shown thru CPD measurements to provide beneficial drag reduction when compared to a single lobe structure. Additionally, the CFD measurements (FIG. 9) show that improved drag resulted when each lobe was mounted substantially flush along, and aligned with, the top edge of the trailer top (i.e. minimum vertical drop). Considering that each lobe 50, 52 can be mounted proximal to the top edge of a trailer door and the top edge of the door is lower than the top edge of the trailer, a vertical drop typically is observed. It is to be appreciated that the inflation of the lobes 50, 52, in the presently configured arrangement, provides for a slight bulging proximal to the mounting surfaces (not illustrated), thereby resulting in the top edge of the lobe being closely aligned with the top edge of the trailer which minimizes the vertical drop (see FIG. 14E). Further, for trailers having a transverse gutter fence along the top edge, the top edge of each lobe, in its inflated position, can be closer in alignment with the top edge of the gutter fence. It is to be appreciated that the aforementioned mounting arrangements do not obscure the upper or lower tail lights on the trailer.

Figure 10:
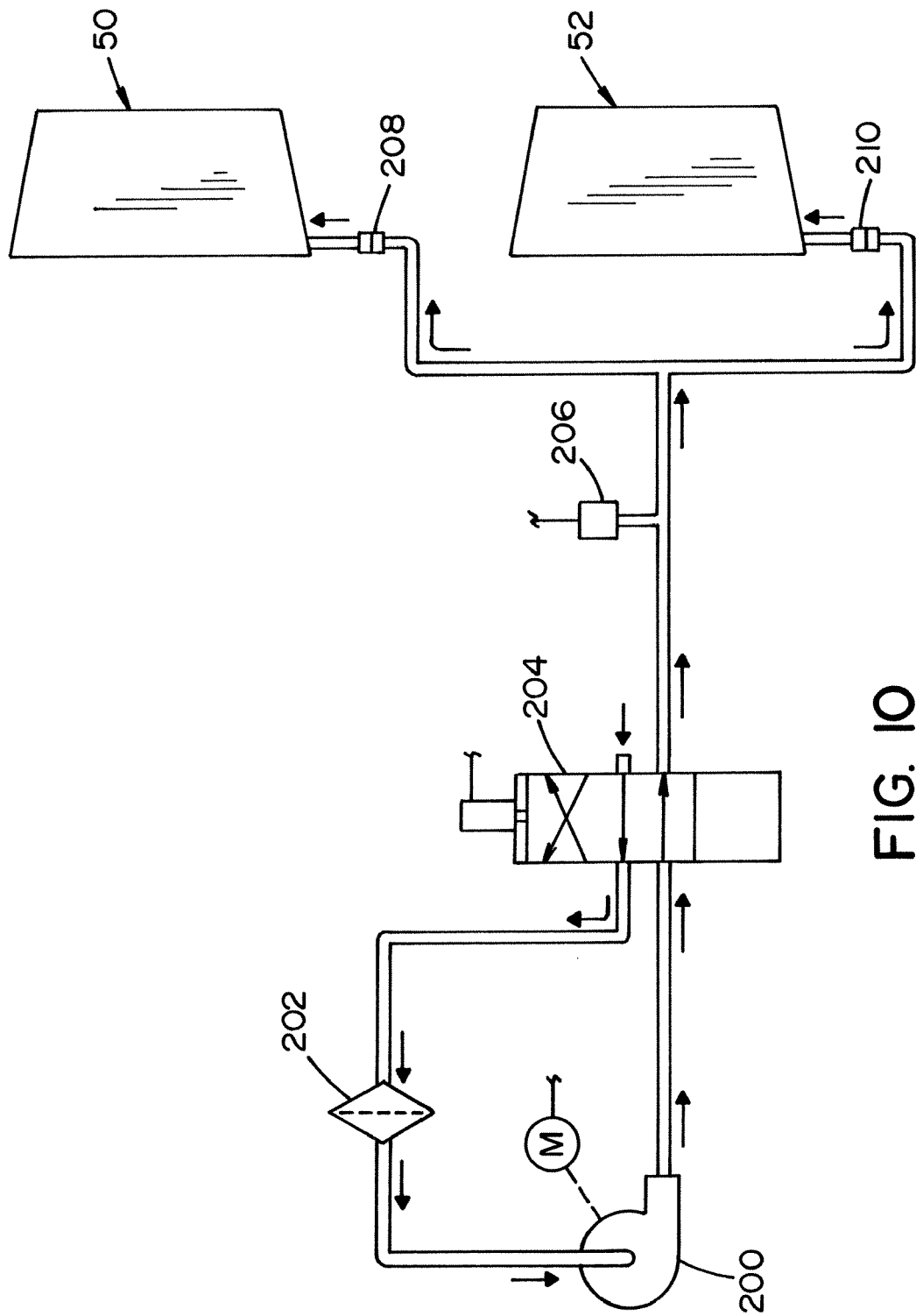
FIG. 10 is a pneumatic schematic diagram for an automated air distribution system (ADS)

More particularly with regard to the support and displacement of each lobe 50, 52 between the deflated and deployed positions thereof, an automated air distribution system (ADS) (FIGS. 10 and 11) is provided and can be mounted, for example, beneath the bottom floor of the trailer by a pair of support arms at laterally opposite ends of the ADS and to which the ADS is suitably secured (not illustrated). Referring to FIG. 10, a pneumatic diagram for the ADS is therein shown. The ADS provides a blower 200, a filter 202, a linear actuator valve 204, a pressure transducer 206, and swivel fittings 208, 210. Alternatively, the filter 202 can be positioned upstream from the valve 204 (not shown). A connection to the air supply can be made near the bottom outside corner of each of the lobes for inflation or deflation.

Figure 11:
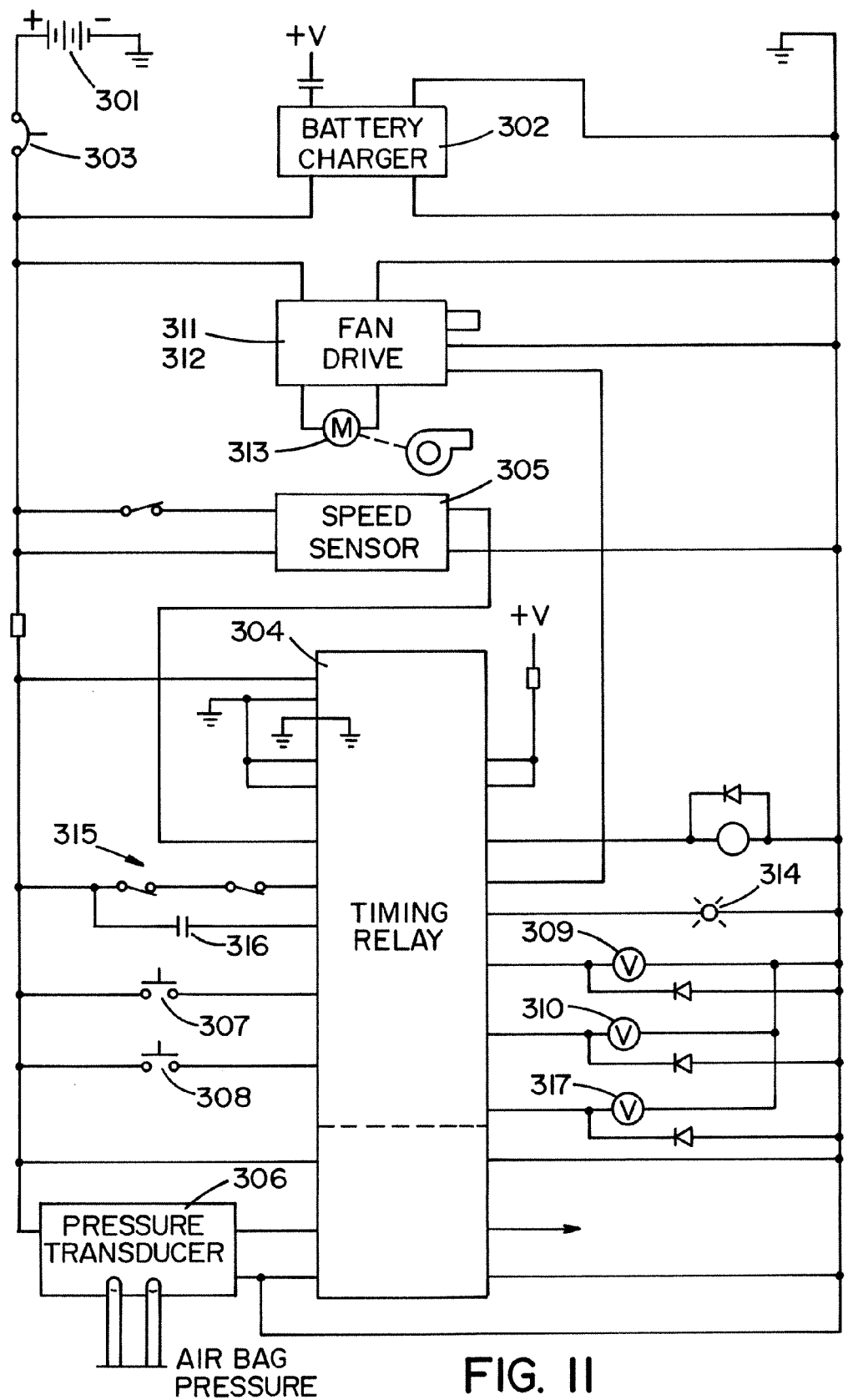
FIG. 11 is an electrical schematic diagram for the automated air distribution system.

Referring to FIG. 11, an electrical schematic diagram for the ADS is therein shown. The electrical diagram provides a battery 301, a battery trickle charger 302, a circuit breaker 303, a timing relay 304, a speed sensor 305, a pressure transducer 306, a manual inflate push button 307, a manual deflate push button 308, an inflate spool valve servo 309, a deflate spool valve servo 310, a blower motor starting relay 311, a blower motor current ramp up control 312, a blower motor 313, a systems status light 314, a door close switch 315, a reverse direction deflation switch 316, and a lobe pressure release switch 317. In one alternative the battery is a stand alone battery used to power the ADS. In another alternative, the battery, via a 'pigtail' connection to the trailer, is the main battery used for powering the vehicles' engine and electrical systems associated with the tractor trailer vehicle.

Figure 12:
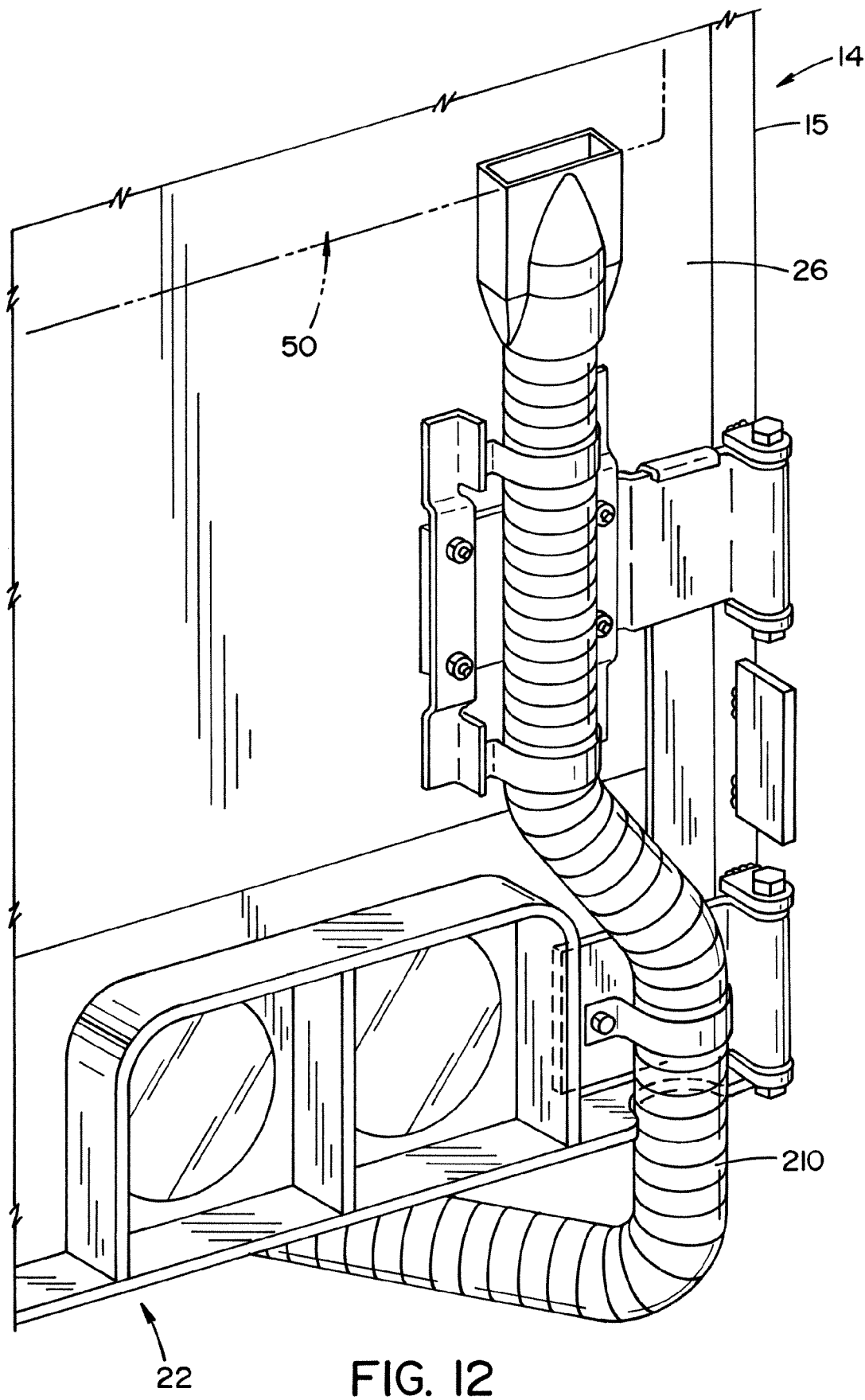
FIG. 12 is a perspective view of a flexible duct for passing air to the lobes.
Figure 13:
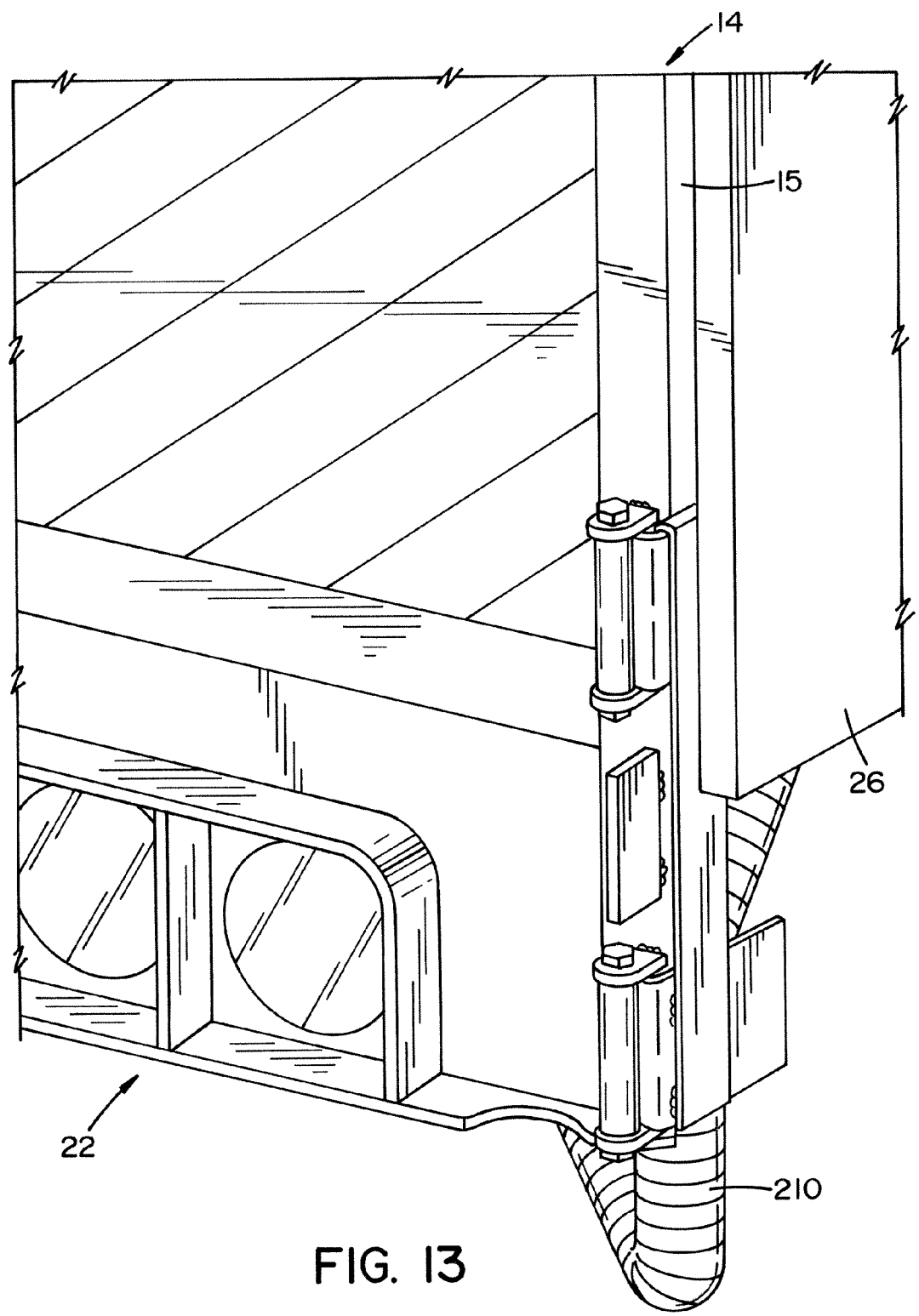
FIG. 13 is a perspective partial view of the flexible duct of FIG. 12 displaying the cargo door in the open position; and, FIG. 14 (A-E) is a chronological sequence of schematic views depicting the sequential steps from closing of the trailer doors to full inflation of the lobes (i.e. operational mode).

Spool valve servos or actuators 309, 310 can be provided for reversing air flow such that the motor 313 can act as a vacuum for extracting the air from the lobes 50, 52 in the deflated or second position. In the second position, the ADS can provide a suction or vacuum force to the lobes 50, 52 which results in the lobes 50, 52 being retained adjacent to, and substantially against, the respective door 26, 28 to which it is mounted. The deflated and retained position can be in a vacuum state, thereby resisting flailing of the lobes 50, 52 when the truck is in motion. In addition, the deflated lobes 50, 52 minimize the space necessary to retain the lobes 50, 52 against the respective rear doors 26, 28 thereby providing clearance for each door to be fully opened and latched to opposing sides 15, 17 of the trailer 14. The ADS can include the tube system or flexible duct 210, as best shown in FIGS. 12-13, through which air passes to the lobes 50, 52.

In one arrangement, each lobe 50, 52 can be a fully enclosed and airtight bag mounted onto a respective rear door 26, 28 of the trailer 14. In operation, the ADS, in the first position, feeds or blows air into each bag to provide inflation pressure from about 0.10 PSI to about 0.80 PSI (refer to FIGS. 14D-14E). In the second position, the ADS sucks or extracts air out of the bags and functions to draw the bags substantially flat against the rear doors (refer to FIG. 14A-14C). The linear actuator valve 204 can serve to trap and maintain the vacuum (i.e., negative pressure of about −0.10 to −0.80 PSI) in the bag. As described above, the deflated position can be maintained while the tractor trailer 12 is in motion and further facilitates full opening and latching of each pivoting rear door 26, 28 to an opposing side 15, 17 of the trailer while the trailer 14 is loaded/unloaded (FIG. 14A).

In one operational arrangement, the ADS can include the door switches 315 or safety mechanism that only allows inflation after the trailer doors 26, 28 are closed and latched. The cycle can start when the inflate switch 307 or a remote is held in the 'auto inflate' position. The lobes 50, 52 can fill to full pressure within a designated period of time. In one example, the lobes can fill in about 2 to 8 minutes. After inflation, the blower 313 can stop automatically. If the lobe pressure decreases, while the trailer 14 is in motion, the blower 313 can re-start automatically and refill the lobe or lobes 50, 52. If the pressure decrease is due to a leak and the leak is large enough that the blower 313 runs for an excessive period of time, i.e. greater than 4 minutes and/or restarts repeatedly, then an alarm can sound and/or system status light 314 will initiate and the blower motor 313 can be shut down. The system status light 314 can be installed proximal to the rear of the trailer, or other location viewable by the driver, providing function alerts to the driver. For example, the system status light 314 can include three lights indicating system on and functioning, system off, and system on and malfunctioning, respectively. The system on and malfunctioning would indicate to the driver that intervention is necessary.

The driver at that point can pull over to the side of the road as soon as possible and inspect the ADS and the lobes 50, 52. A temporary repair can be made using a repair kit (not illustrated). To reset the electrical system, the circuit breaker 303 can be turned off and then back on. The lobe can then be deflated under vacuum. If not repairable, the lobe can be manually fastened substantially flat against the associated door using, for example, ties or straps wrapped around the lobe (not illustrated). The driver can then continue the trip with a secured and deflated lobe.

To operate the deflate cycle, the rear doors can be in the closed and secured orientation. The deflate cycle will start when the deflate switch 308 or remote is held in the 'deflate' position. The lobes 50, 52 will deflate and shut off automatically in a predetermined amount of time, i.e. approximately 2 to 8 minutes. In addition, the lobes 50, 52 can be attached to the pressure sensor 206 in which the inside pressure of the lobes are measured. The sensor 206 can then shut off the motor 313 when a predetermined pressure is reached. For example, during the inflation cycle, the motor 313 can stop when the pressure reaches about 0.5 psi. The vacuum created in the deflate cycle holds or retains the lobe substantially flat against the door to resist flailing while the vehicle is in motion. It is to be appreciated that the deflate cycle can be initiated prior to parking the vehicle, at lower speeds, and/or after the vehicle has stopped, thereby obviating the situation where the deflated lobe is subjected to crosswinds while the vehicle is in motion at elevated, i.e. highway, speeds. Once the vehicle has been parked and the lobes have been fully deflated, the doors can be opened and swung all the way around to the respective sides of the trailer 14. The doors can be positioned laterally outwardly of the sides of the trailer, and it will be appreciated that there is a sufficient clearance between the door and the side of the trailer to enable the vacuum retained lobe to rest therebetween without impeding the movement of the doors and without damaging the lobes (FIG. 14A).

As one illustrative example of the inflation/deflation process and the ADS mechanism (FIGS. 10 and 11), the following is provided. In an autonomous operational arrangement, the ADS can provide the forward speed sensor mechanism 305, via connection to a rear axle, for example, that initiates inflation after the trailer doors are closed and latched, and after the vehicle has obtained a predeterminable or set speed for a predeterminable or set period of time. One set of parameters can include a set or threshold speed of 42 mph, or more, for a continuous period of at least 4 minutes, for example. The cycle for inflation can then initiate once the set speed and set period have been reached. Similarly, the ADS can include a forward speed sensor mechanism, and rearward sensor 316, that initiates deflation after the vehicle's speed has declined to a predeterminable or set speed for a predeterminable or set period of time. One set of parameters can include a set speed of 42 mph, or less, for a continuous period of at least 6 minutes, for example. The cycle for deflation can then initiate once the set speed and set period have been reached. Alternatively, if rearward movement has been detected, via sensor 316 connected to a back-up light, for example, then deflation can also be initiated/verified. In this operational arrangement, the ADS functions autonomously without any intervention necessary from the driver. It is to be appreciated that other initiation parameters for inflation and deflation can be predetermined and programmed into the ADS.

In one embodiment, wherein the air duct system is installed as an after-market item, each air duct 210 connected to a respective lobe can include a hinged or swivel fitting(s). The hinged fittings allow enough range of motion in order to accommodate the pivoting of the doors 26, 28 and the respective lobes 50, 52 to which the air ducts 210 are attached. The hinged fittings also can be positioned to minimize structural torque of the air duct. The air duct mounted to each lobe can include the swivel fitting(s) mounted underneath the trailer 14 to allow enough range of motion in order to accommodate the pivoting of the doors and the respective lobes to which the tubes are attached. The flexible air ducts can alternatively be mounted to respective rigid guide plates which in turn can be secured to the respective hinges of the rear doors (not illustrated). The air ducts 210 can be somewhat flattened, such that the portion of the air duct extending along the outside of the trailer door forms a substantially flat rectilinear cross section adapted for minimizing the amount of space necessary to store the air duct and its respective connected lobe behind the trailer door during unloading and/or storage.

The ADS can include motorized valves, i.e. spool valves and ball check valves 309, 310 wherein a first valve 309 allows air to pass through the tubes in a first direction for inflation of the lobes, 50, 52. A second valve 310 allows air to pass through the tubes in a second direction for deflation of the lobes 50, 52. In connection with displacement of inflatable lobes 50, 52 from the deflated to the deployed position thereof as described above, the motor 313 blows air into the associated tubes 210 whereby the air passes into bags. The valves 309, 310 enable the air to pass through, for example, a y-connection having a sensor which can detect the pressure differential in the bags (not illustrated). The pressure in the bags can be controlled if necessary and equalized automatically. If either lobe should suffer a leak, the ADS system will feed air into the system and thus maintain equal pressure and symmetry of the respective bags. Alternative inflation means can be employed such as tapping into a compressed air source currently available on many tractor trailers for actuating valves and using injectors to draw ambient air into the lobes for inflation/deflation.

While considerable emphasis has been placed herein on the structures and structural interrelationships between the component parts of the embodiments discussed in the disclosure, it will be appreciated that many embodiments can be made and that many changes can be made in the embodiments herein illustrated and described without departing from the principles of the disclosure. In this respect, for example, it will be appreciated that other motor driven arrangements can be provided for displacing the inflatable lobe between the deflated and deployed positions thereof. These and other modifications of the disclosed embodiments as well as other embodiments of the disclosure will be suggested and obvious to those skilled in the art, whereby it is to be distinctly understood that the foregoing descriptive matter is to be interpreted merely as illustrative of the disclosure and not as a limitation.

The invention claimed is:

1. A drag reducing apparatus for a vehicle rear end having adjacent rear doors, each said door including opposed pairs of parallel walls and a substantially flat upwardly extending rear surface intersecting said walls to provide opposed pairs of parallel edges therewith, said drag reducing apparatus comprising:
    a pair of inflatable lobes, each said lobe including opposing top and bottom surfaces, opposing side surfaces, a base surface mounted to the rear door, and a substantially planar aft-face surface distal to the rear door;
    each said lobe comprises a fully enclosed airtight bag having a deflated position and an inflated position relative to the rear end of the vehicle;
    each said lobe in said inflated position overlying said base surface therefrom between said opposed pairs of parallel edges;
    each said lobe in said inflated position provides an aerodynamic substantially planar contour extending rearwardly of the rear end of the vehicle wherein each of said opposing side surfaces having at least a first slope relative to each of one opposed pair of parallel edges, and each of said opposing top and bottom surfaces having at least a second slope relative to each of another opposed pair of parallel edges;
    wherein each of said lobes include a medial side, said medial side of said one lobe diverges from said medial side of said other lobe; and,
    a vacuum mechanism on said vehicle for deflating said lobes;
    said vacuum mechanism and said air tight bags upon deflation create a vacuum force within said lobes for retaining said lobes adjacent to, and substantially against, the rear end of the vehicle thereby preventing movement of said lobes in said deflated position.

2. The apparatus according to claim 1, wherein said first slope and said second slope are constant and substantially equal.

3. The apparatus according to claim 1, wherein said first slope relative to a first plane perpendicular to the rear door and said second slope relative to a second plane perpendicular to the rear door are in a range from about 4 to about 12 degrees.

4. The apparatus according to claim 1, wherein said first slope relative to a first plane perpendicular to the rear door and said second slope relative to a second plane perpendicular to the rear door are in a range from about 6 to about 10 degrees.

5. The apparatus according to claim 1, wherein said lobes are inflated with an air pressure from about 0.10 psi to about 0.50 psi.

6. The apparatus according to claim 1, wherein said lobes are inflated and deflated with a pressure from about −0.25 psi to about +0.50 psi.

7. The apparatus according to claim 2, wherein said first slope relative to a first plane perpendicular to the rear door and said second slope relative to a second plane perpendicular to the rear door are in a range from about 6 to about 10 degrees.

8. The apparatus according to claim 2, wherein each said lobe assumes a truncated substantially pyramidal shape and said substantially planar aft-face surface is less than 6 feet from the rear door when said lobe is inflated.

9. The apparatus according to claim 2, wherein each said lobe assumes a truncated substantially pyramidal shape and said substantially planar aft-face surface is from about 3 feet to about 5 feet from the rear door when said lobe is inflated.

10. The apparatus according to claim 2, wherein said opposing top and bottom surfaces define a height, said height tapers from a maximum height to a minimum height;
    said maximum height is from about 6 feet to about 9 feet; and,
    said minimum height is from about 70% to about 94% of said maximum height.

11. The apparatus according to claim 2, wherein said opposing side surfaces define a width, said width tapers from a maximum width to a minimum width; and,
    said minimum width is from about 60% to about 90% of said maximum width.

12. The apparatus according to claim 1, wherein said lobes are interchangeable with each other and mountable to either of the rear doors.

* * * * *

UNITED STATES PATENT AND TRADEMARK OFFICE
CERTIFICATE OF CORRECTION

PATENT NO.        : 8,287,030 B2                                    Page 1 of 1
APPLICATION NO.   : 12/594662
DATED             : October 16, 2012
INVENTOR(S)       : Patrick E. Ryan et al.

It is certified that error appears in the above-identified patent and that said Letters Patent is hereby corrected as shown below:

On the Title Page, Item (73) Assignee, should read as follows:
-- (73) Assignee:  Aerodynamic Trailer Systems, Ltd.,
                   Aurora, Ohio --

Signed and Sealed this
Fourteenth Day of April, 2015

Michelle K. Lee
*Director of the United States Patent and Trademark Office*